United States Patent [19]

Tindell

[11] Patent Number: 4,841,731

[45] Date of Patent: Jun. 27, 1989

[54] ELECTRICAL ENERGY PRODUCTION APPARATUS

[75] Inventor: Gene Tindell, Dallas, Tex.

[73] Assignee: Electrical Generation Technology, Inc., Dallas, Tex.

[21] Appl. No.: 141,154

[22] Filed: Jan. 6, 1988

[51] Int. Cl.$^4$ .............................................. F03G 7/02
[52] U.S. Cl. .................................. 60/641.8; 60/39.12; 136/248; 136/291; 204/129; 290/1 R
[58] Field of Search ............... 136/248, 291; 204/129, 204/278; 60/39.12, 641.8; 290/1 R

[56] References Cited

U.S. PATENT DOCUMENTS

| | | | |
|---|---|---|---|
| 3,459,953 | 8/1969 | Huger | 290/2 |
| 4,021,323 | 5/1977 | Kilby | 204/129 |
| 4,161,657 | 7/1979 | Shaffer, Jr. | 290/1 R |
| 4,216,067 | 8/1980 | Mitchell | 204/129 |
| 4,341,607 | 7/1982 | Tison | 204/129 |

Primary Examiner—Aaron Weisstuch
Attorney, Agent, or Firm—John M. Cone

[57] ABSTRACT

A solar-powered system for supplying large quantities of usable power consists of an array of photo-voltaic cells which drive an electrolysis generator in which water is converted into oxygen and hydrogen gases. The oxygen and hydrogen gases are initially stored and then mixed in stoichiometric amounts and delivered by means of a water-cooled discharge nozzle to a burner chamber in which the gases are recombined. High pressure steam produced by the oxygen/hydrogen recombination is discharged from the burner to a turbine generator. Condensed water is collected from the turbine and used as distilled water for domestic uses or returned to the electrolysis generator.

5 Claims, 3 Drawing Sheets

ELECTRICAL ENERGY PRODUCTION APPARATUS

BACKGROUND

1. Field of the Invention

This invention relates to a process and apparatus for harnessing the sun's energy to provide a primary power source for supplying large quantities of usable power and, as a by product, distilled water for domestic use.

2. Description of the Prior Art

Prior systems for producing electrical power are ecologically destructive, having an adverse impact on the environment either because of their prodigious consumption of irreplaceable fossil fuels, or because of an adverse impact on the environment caused by their combustion of fossil fuels. Attempts have been made to use the sun's energy either to heat dwellings or to generate electricity through some form of conversion device, such as a photovoltaic cell or thermocouple., see for example, U.S. Pat. Nos. 4,326,013 (Jacobi) and 4,246,080 (Shinn). these attempts, however, have failed to provide satisfactory means for generating large quantities of electric power.

The present invention seeks to provide an ecologically advantageous electrical energy production system in which substantially no use is made of precious fossil fuel reserves during operation of the system. The present invention also seeks to harness the sun's power effectively and efficiently. In addition, the invention provides, in one form, a water treatment system which can provide distilled water for domestic use from, for example, polluted river water.

SUMMARY OF THE INVENTION

According to the present invention there is provided an electrical energy production apparatus comprising a solar energy conversion means adapted to produce a direct current electrical output when irradiated by the sun, an electrolysis means powered by the direct current electricity produced by the conversion means, means for receiving oxygen gas and hydrogen gas produced by the electrolysis means and for mixing predetermined quantities of the hydrogen and oxygen gases, nozzle means for feeding the mixed hydrogen and oxygen to a burner chamber in which the oxygen and hydrogen gases are combined to produce steam, and an outlet of the burner chamber for discharging pressured steam. Preferably the pressurized steam from the outlet is delivered, via a steam pressure regulator, in a conventional manner, to drive a turbine system and generate electricity. Condensed water from the turbine system is returned to the electrolysis means for re-conversion therein. The apparatus and method in one form, essentially comprises a closed loop system, which consists of the electrolysis means, the hydrogen and oxygen receiving and mixing means, the burner chamber and the condensation section of the turbine system. In an alternative form, the apparatus and method are operated as an open looped system taking polluted water, e.g., river water as the intake to the electrolysis generator and supplying distilled water for domestic use from a condensate return line of the turbine system.

Advantageously, the nozzle means comprises central discharge orifices through which the oxygen and hydrogen gases pass and a surrounding array of openings which can be connected to the condensate. The condensate water fed to said array of orifices serves to cool the nozzle and to supply water to the interior of the burner chamber to control the temperature of the steam discharged through said outlet.

In a preferred form of the apparatus the gas receiving means includes means for separately storing the hydrogen and oxygen gases and means are provided for withdrawing stoichiometric quantities of the gases for delivery to the burner chamber.

BRIEF DESCRIPTION OF THE DRAWINGS

The invention will now be described more particularly and by way of example only, with reference to the accompanying drawings in which.

DESCRIPTION OF THE PREFERRED EMBODIMENT

Figure 1:
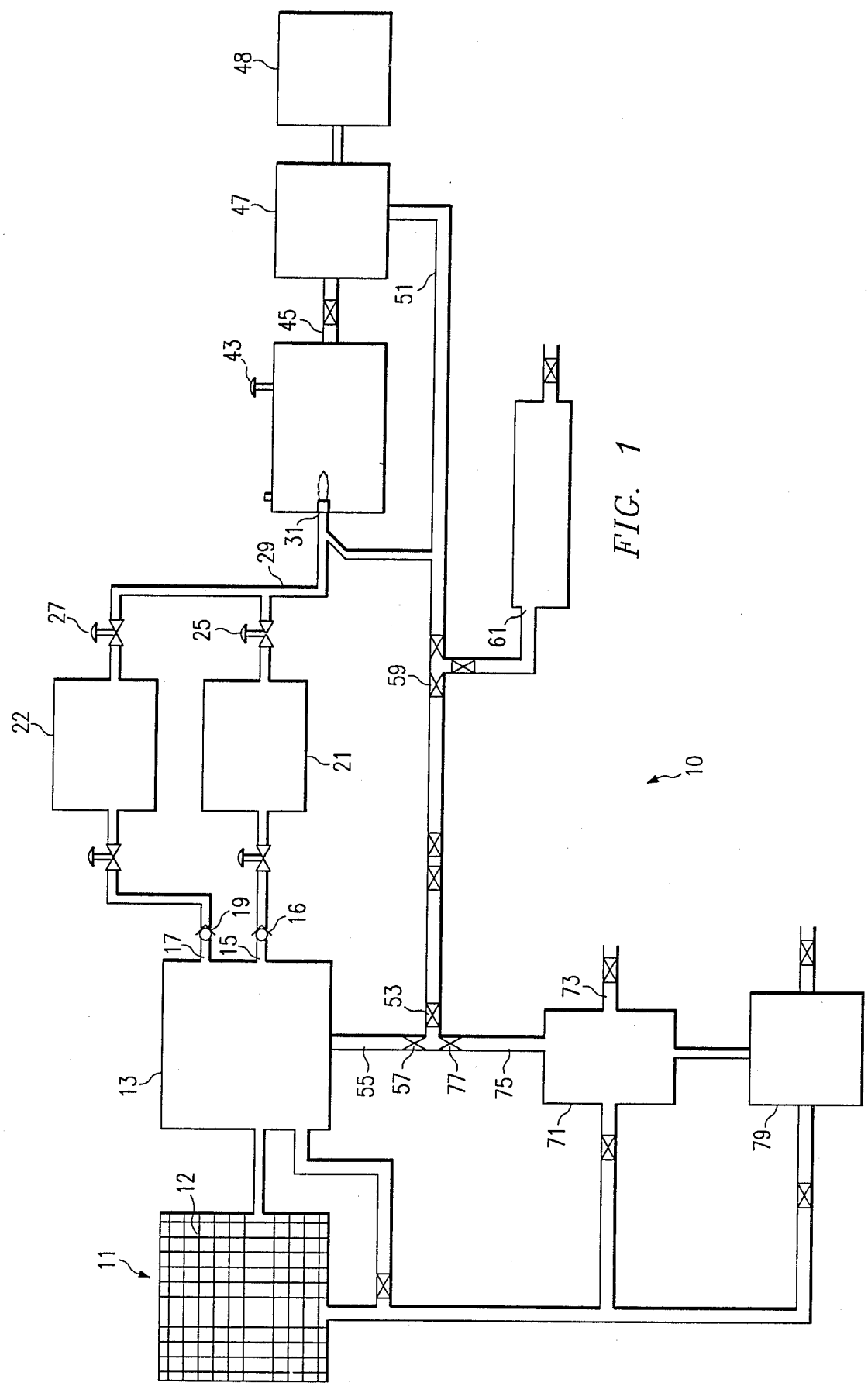
FIG. 1 is a schematic representation of the process and apparatus of the present invention.

As shown in the drawing, an electrical energy production means 10 comprises an array 11 of solar actuated voltaic cells 12 is arranged to receive incident radiation from the sun. The cells 12 are preferably the thin film, amorphous silicon alloy parts, voltaic cells produced by SOVONIC Solar Systems, or equivalent cells produced by Sony Corporation. The construction and operation of these cells are well known in the art and are not a part of this invention. The solar cell array when subject to solar radiation, produces DC electric current in a manner well known to those skilled in the art.

This electricity is supplied to the electrodes of an electrolytic cell 13 containing a 25% caustic soda or caustic potash electrolyte solution. Oxygen gas is generated at the anode 15 of the cell 13 and is collected in an anode hood 16 thereof. Hydrogen gas is discharged at the cathode 17 of the cell 13 and is collected in a cathode hood 19. The EC Series hydrogen generator system sold by Teledyne Energy Systems of Maryland is a suitable elctrolytic cell for this purpose.

The oxygen and hydrogen gases produced by electrolysis are stored under pressure in storage tanks 21 and 23 respectively. In the case of the hydrogen, the gas may, alternatively, be stored, for example, in hydride form. Mixing valves 25 and 27 and associated pipelines 29 connect the storage tanks 21 and 23 means to a stainless steel, watercooled nozzle 31, the downstream end of which is located at one end of the interior of a heat insulated burner chamber 33.

Figure 2C:
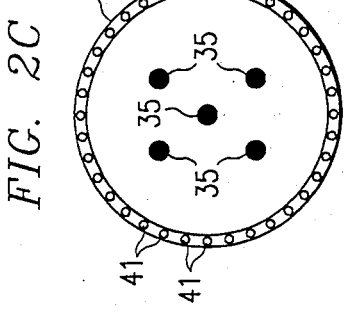
FIGS. 2A-2 C show the nozzle of the apparatus of FIG. 1.
Figure 2B:
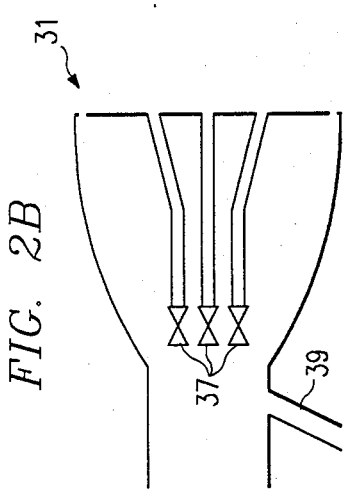
Figure 2A:
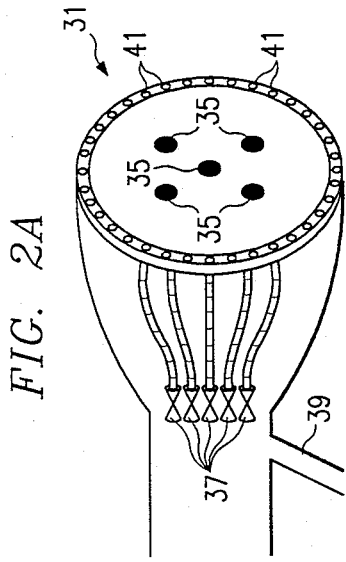

As shown in FIG. 2 of the drawings, the nozzle 31 includes five central orifices 35 in the downstream face thereof, each connected to a respective mixing control valve 37 which in turn is connected to the storage tanks 21 and 2 containing hydrogen and oxygen gas. The orifices 35 are surrounded by a water jacket 38 which receives feed water 39 and which has a circular array of openings 41 in the downstream face of the nozzle surrounding the orifices 35. The oxygen and hydrogen gases are first mixed by means of the valves 37 in the appropriate stoichiometric proportions and then burned as they exit the nozzle 31. The additional water entering the chamber 33 from the openings 41 serves to reduce the temperature of the steam produced by the oxygen/hydrogen recombination from a temperature of about 5400° F to about 1250° F.

Pressure in the chamber 33 is maintained at about 1250 lb. p.s.i. and a pressure relief valve 43 is provided for venting the chamber to prevent dangerous increases of pressure beyond that figure.

Steam produced in the chamber 33 is fed via an outlet 45 to a steam turbine 47, the construction and operation of which is well understood by those skilled in the art. The turbine 47 drives a generator 49, again in a manner well know by the skilled addressee, to produce electricity.

Condensate water provided in the turbine 47 is returned, via a water return line 51, to the electrolysis cell 13, via a valve 53. The valve 53 gives access to an electrolytic cell water intake line 55, which includes a valve 57. In use, the valves 53 and 57 are opened to allow condensate water to return to the cell 13 for further electrolysis.

The line 51 includes a valve 59 connecting to an outlet 61 through which distilled water can be removed from the line 51.

As seen in FIG. 1, the energy production apparatus is preferably teamed with a water system which can make use of the heat generated..by the voltaic cells 13, which in general will produce 80% heat and 20% electrical energy from the incident radiation, and of the condensate water formed by the hydrogen/oxygen recombination. In the example show in FIG. 1, the energy production apparatus is coupled to a waste water treatment plant indicated schematically at 71. The plant receives waste water, e.g. sewage, through an inlet 73. After treatment, cleansed water from the plant 71 can be fed via line 75 through valve 77 to the electrolysis cell water intake line 55 for the cell 13. The addition of this treated water to the distillate water enhances the operation of the electrolytic cell 13.

Solids material from the treatment plant 71 are transferred to a heat treatment apparatus 79 at which the dewatered solids are dried further, using heat produced from the solar cell array 11, as indicated schematically in FIG. 1. The construction of the heat treatment plant is well known in the water treatment art and does not form part of this invention.

As can be appreciated from FIG. 1, the apparatus can also be operated to supply distilled water for domestic use in areas in which the natural water supply is contaminated. In this mode of operation, polluted water, e.g. river water, is fed to the intake line 55. After electrolysis and recombination, distilled water is received at the water return line 51 which can be supplied for domestic use via the outlet 61, while further polluted water is provided to the cell 13 via the intake line 55.

As further shown in FIG. 1, heat from the solar cells 12 may also be used to assist the electrolysis by warming the cell 13.

Figure 3:
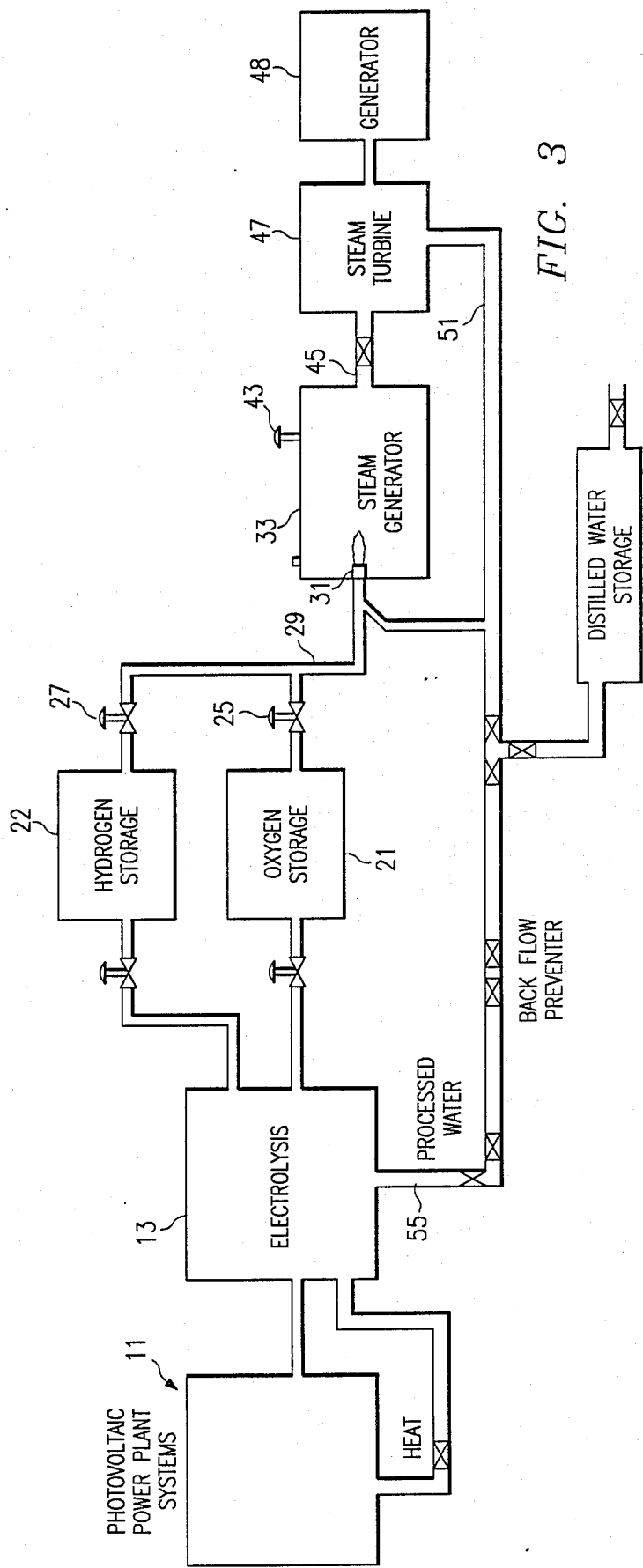
FIG. 3 is a schematic representation of a closed loop version of the apparatus.

The apparatus shown in FIG. 1 operates in an open-loop manner. The present invention also has application in the case of a closed loop system. An example of this mode is shown in FIG. 3 in which elements of the apparatus similar to elements of the apparatus described with respect to Fig. 1 are given the same reference number as given in FIG. 1. The apparatus shown in FIG. 3 is substantially the same as that of FIG. 1 without the treatment plant 71 and the outlet 61. Instead, the water return line 51 from the turbine 47 is connected directly to the water intake line 55 of the electrolytic cell 13.

Figure 4:
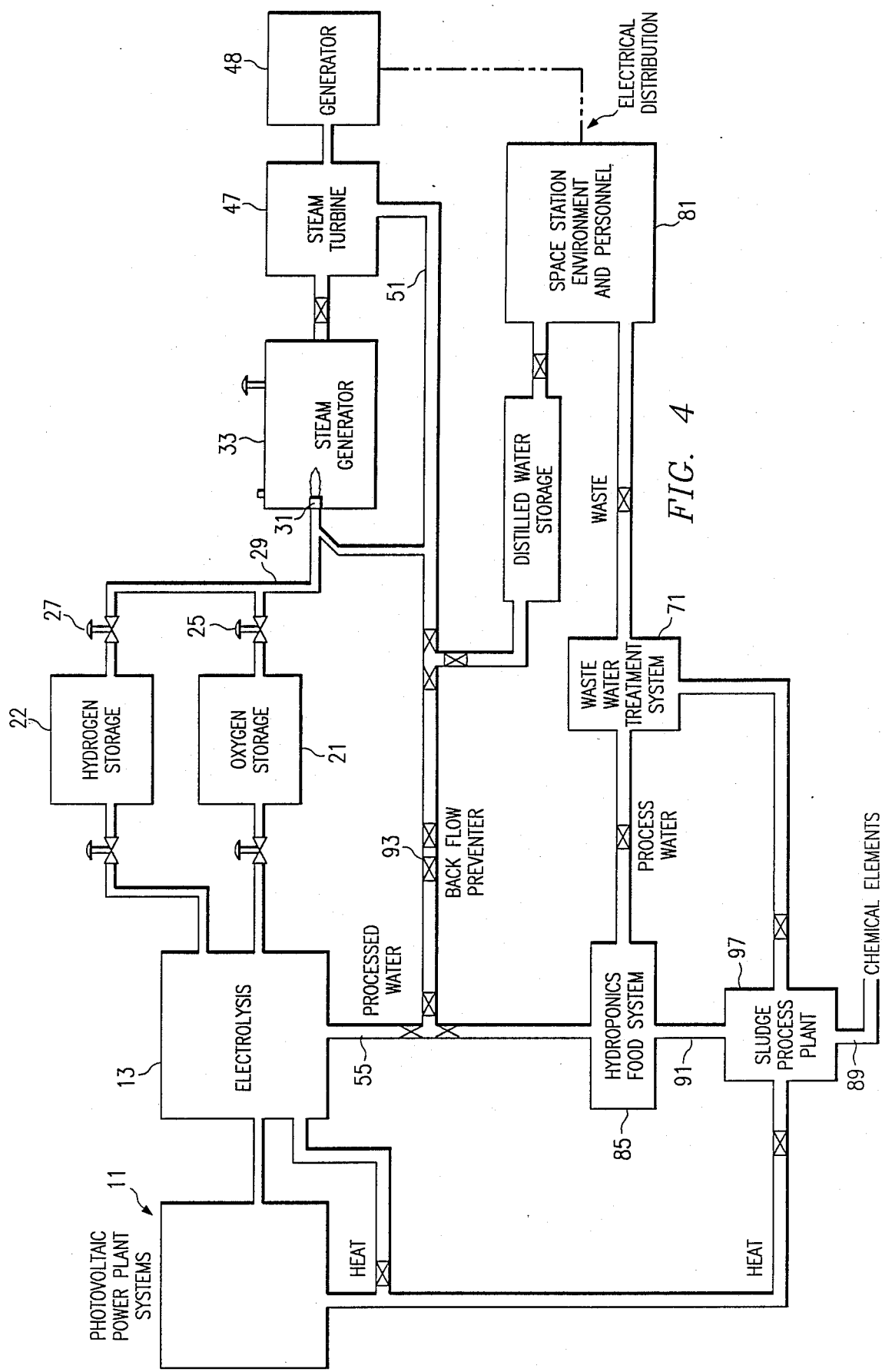
FIG. 4 is a schematic representation of a further embodiment of the invention.

A further, closed loop version of the apparatus is shown in FIG. 4. This version is designed for use in a space station. The apparatus in FIG. 4 is in large part similar to that in FIG. 1 and similar elements will be identified by the same reference number as used in FIG. 1.

The apparatus in FIG. 4 comprises solar cell array 11, an electrolytic cell 13, hydrogen and oxygen storage tanks 22 and 21, a combustion chamber 33 and a turbine 47 and a generator 49. These elements are arranged to operate as described above with reference to FIG. 1. As shown is FIG. 4, the apparatus is associated with a life support system of the space station. Electrical power from the generator is used to prove the life support and environmental system 81 of the station. Associated with the system 81 is a distillate water storage means 83 which provides water for consumption by personnel and as make up water to the solar/electrical energy conversion means. In use, the distillate water storage mean 83 could be refinished, as needed, by heat supplies from earth.

FIG. 4 illustrates that the life support/environmental system 81 collects human waste products which are transferred to a waste water treatment system 71. Processed water from the system 71 is fed to a hydroponics food production system 85, the construction of which is well known to those in the Art and does not form part of the present invention. Solids, waste material, sludge, from the system 71 are delivered to a sludge process plant 87. In the plant 87, the sludge is further located to separate out chemicals which are removed through outlet 89. Mineral waste is fed from a further outlet 91 to the hydroponics system 85 to enrich the growing environment of the plants. Water exiting to hydroponics system 85, after depletion of minerals, is fed to the water intake line 55 of the electrolytic cell 13. As seen in FIG. 4, the water return line 51, in this form of the invention, includes a back flow prevention valve 93 to prevent mixing of the processed water from the hydroponics system 85 with the distilled water in the distillate water storage means 83.

I claim:

1. An energy production apparatus comprising a solar energy conversion means adapted to produce a direct current electrical output when irradiated by the sun, an electrolysis means powered by the direct current electricity produced by the conversion means, means for receiving oxygen gas and hydrogen gas produced by the electrolysis means and for mixing pre-determined quantities of the hydrogen and oxygen gases, nozzle means for feeding the mixed hydrogen and oxygen to a burner chamber in which the oxygen and hydrogen gases are combined to produce steam, and an outlet of the burner chamber for discharging pressured steam, said nozzle means comprising central discharge orifices through which the oxygen and hydrogen gases pass and a surrounding array of openings for connection to a supply of distilled water.

2. Apparatus as claimed in claim 1 wherein the pressurized steam for the outlet ids delivered, via a steam pressure regulator to drive a turbine system and generate electricity.

3. Apparatus according to claim 2 including means for removing condensate water from an outlet of the turbine system.

4. Apparatus as claimed in claim I wherein condensed water from the turbine system is returned to the electrolysis means for re-conversion therein.

5. Apparats as claimed in claim 1 including means for delivering to the electrolysis means waste water for purification during operation of the apparatus.

* * * * *